United States Patent [19]

Stocchiero

[11] Patent Number: 5,111,952
[45] Date of Patent: May 12, 1992

[54] LID WITH A HANDLE FOR CONTAINERS OF ACCUMULATORS

[76] Inventor: Olimpio Stocchiero, 5 Via Kennedy, 36050 Montorso Vicenting (VI), Italy

[21] Appl. No.: 665,315

[22] Filed: Mar. 5, 1991

[30] Foreign Application Priority Data

Mar. 6, 1990 [IT] Italy .................... 85539 A/90

[51] Int. Cl.$^5$ ............................. B65D 23/10
[52] U.S. Cl. .................................... 220/94 R
[58] Field of Search ................. 220/94 R; 190/115

[56] References Cited

U.S. PATENT DOCUMENTS

| | | | |
|---|---|---|---|
| 3,438,480 | 4/1969 | Chabrelot | 220/94 R X |
| 3,927,812 | 12/1975 | Winters et al. | 220/94 R |
| 4,344,534 | 8/1982 | Sutton | 220/94 R X |
| 4,516,687 | 5/1985 | Taguchi et al. | 220/94 R |
| 4,632,888 | 12/1986 | Kump et al. | 429/187 |
| 4,925,054 | 5/1990 | Rau et al. | 220/94 R |

FOREIGN PATENT DOCUMENTS 1429439 3/1976 United Kingdom .

*Primary Examiner*—Steven M. Pollard

[57] ABSTRACT

The invention discloses the realization of a lid equipped with a handle for containers of accumulators, comprising in combination an essentially flat surface which constitutes part of the upper portion of the lid and which presents at least one pair of openings. Each opening has in its inner part at least one projecting grip pawl. At least one elastic handle with at least one projecting tooth is positioned at each of its ends. The central body of the handle is entirely lodged inside a housing made in the upper portion and each end is coupled within one of the openings which are situated in the upper portion. When the handle is lifted, its projecting teeth engage in the corresponding projecting grip pawls of the lid, thereby allowing the accumulator to which the lid is connected to be lifted.

4 Claims, 1 Drawing Sheet

LID WITH A HANDLE FOR CONTAINERS OF ACCUMULATORS

BACKGROUND OF THE INVENTION

It is known that the lifting and the transport of accumulators are difficult to perform, both because of their considerable weight and because the accumulators are generally situated in narrow and not very accessible places, particularly the startup accumulators.

Certains makers have solved this problem by installing one or more handles on the accumulator lids. Said handles make both the extraction of the accumulator from its housing and the transport easier.

A constructive solution particularly suited for small accumulators is known, according to which the handle is composed of a U-shaped element, preferably made of plastic material and connected to the lid by means of pivots. Said handle can rotate around the pivot axis and, when it is at rest in a horizontal position, it is completely within the raised portion on the upper part of the lid, where the topping up caps are located so that the handle does not project over the upper surface of the lid.

As far as larger accumulators are concerned, two handles of the afore-mentioned type are installed; each handle is pivoted to the lid and is placed transversally to the alignment axis of the topping up caps. In such a case, when the two handles are at rest in a horizontal postion, they too are within the raised portion which is made on the upper part of the lid where the topping up caps are placed in such a way that, in this case too, the handles do not project above the upper surface of the lid.

The handles of the described type present some disadvantages. The first disadvantage is their high realization and assembly costs, the latter being due to the difficulty of the assembly. Another disadvantage of the handles of the known type is that it is difficult to lift them in a position suited for the transport of the accumulator. This is due to the smooth surface of the handles, which are difficult to grip.

Another disadvantage, which one encounters when two handles are applied to the accumulator lid, is that a recess in which to place the handles is necessary for the handles not to project over the upper part of the lid when they are at rest in a horizontal position; the recess is placed in an essentially central position and is transverse to the alignment axis of the topping up caps. This implies the interruption of the gas discharging horizontal duct which transversally connects all the topping up caps, which do not communicate with each other, so that two transverse ducts are necessary. Each duct connecting the topping up caps being placed at the sides of the transverse recess where the handles are lodged.

SUMMARY OF THE INVENTION

The purpose of the invention is the realization of a lid equipped with a handle for containers of accumulators, which overcomes the afore-mentioned disadvantages.

More in detail, the purpose of the present invention is the realization of a lid equipped with a handle characterized by a low realization cost and by the fact that the assembly of the handle to the lid is quick, easy and cheap.

Another purpose of the invention is the realization of a lid equipped with a handle, the latter being characterized in that it does not project over the upper surface of the lid when the handle is at rest in a horizontal position, and is lodged inside a recess made in the lid; the recess does not break the continuity of the gas discharging horizontal duct which transversally connects all the topping up caps.

Another purpose of the invention is the realization of a lid equipped with a handle, the latter being easy to lift and grasp. Not the least purpose of the invention is the realization of a lid equipped with a handle, whereby said handle automatically goes back inside the housing in which it lies at rest after being released.

The above-mentioned purposes and others which will be better understood hereafter are reached by the realization of a lid equipped with a handle for containers of accumulators which is characterized in that it comprises in combination:

- an essentially flat surface which is part of an upper portion of the lid the upper portion includes at least one couple of side openings which are coaxial and opposed to each other; each opening has at least one projecting grip pawl in its interior;
- at least one handle formed by an elastic body presenting shaped ends, with each end having at least one projecting tooth, whereby said handle has a central body completely lodged within a housing made in the lid upper portion. Each end is inserted in one of the openings and the projecting teeth of the handle engage in the corresponding grip pawls of the lid when the handle is lifted.

According to a preferred embodiment of the invention, the housing in which the handle is lodged presents a surface which is below the flat surface of the upper portion of the lid a distance which corresponds to the thickness of the handle.

Thus, when the handle is at rest inside its housing, it does not project from the upper plane of the lid, so that the piling up of the accumulators is not jeopardized. The handle is preferably made of flexible plastic material with a small thickness. Advantageously, a lid according to the invention is realized equipped with a handle which is cheap, easy to assembly and to lift from its housing.

Moreover, advantageously, the handle is easy to grasp and it automatically goes back inside its housing after being released.

BRIEF DESCRIPTION OF THE DRAWINGS

The above-mentioned purposes and advantages will became apparent from the description of a preferred form of embodiment, which is given by way of illustration only, since various changes within the spirit and scope of the invention will become apparent to those skilled in the art from this detailed description and from the drawings, wherein.

DESCRIPTION OF THE PREFERRED EMBODIMENTS

Figure 1:
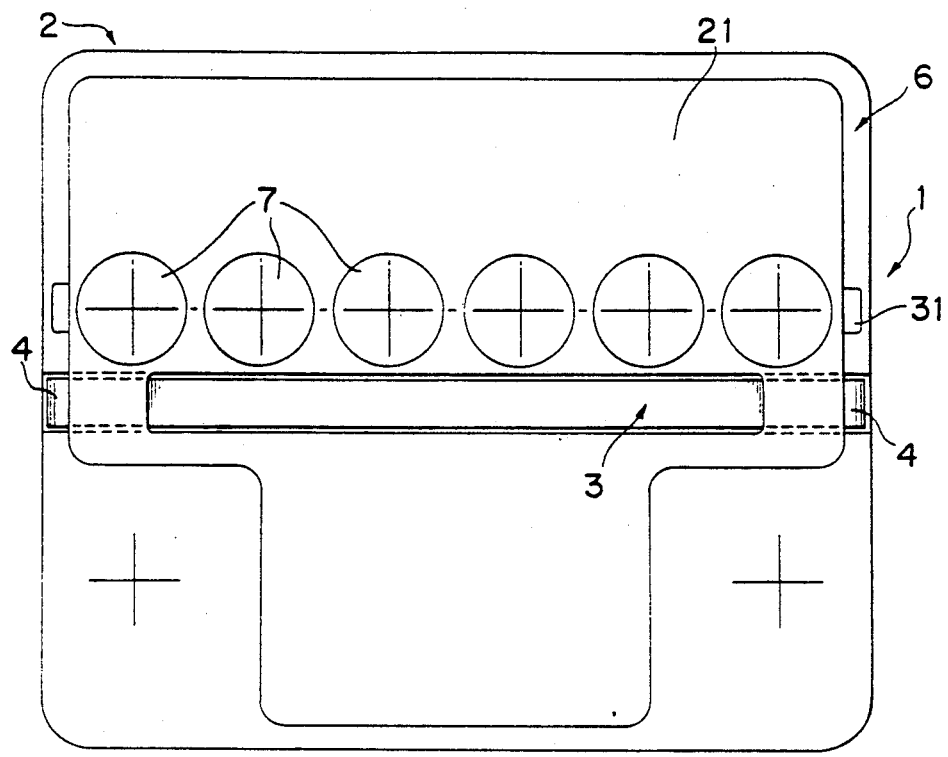
FIG. 1 shows a plan view of the lid equipped with a handle according to the invention.

As can be seen in FIG. 1, the invention indicated as a whole with 1, is composed of a lid 2 which is parallel to the alignment axis of the topping up caps 7. A handle 3 is applied to the lid, and each end 4 of the handle is inserted into a horizontal opening 5, which can be seen in FIGS. 2 and 3 and which passes through a portion 6 of the lid, where the topping up caps are placed. The two lateral openings 5 are coaxial and in connection with a housing 8; said housing is made in the portion 6 of the lid 2, is parallel to the alignment axis of the topping up caps 7 and contains the whole body 9 of the handle, when the latter is at rest in a horizontal position. It is understood that the housing does not break the continuity of the gas discharging transverse duct 31 which connects the topping up caps.

It must be specified, however, that according to a particular embodiment, it is possible to apply more than one handle. In addition to this, according to a specific embodiment of the invention which can be applied either to lids for small accumulators or to lids which do not have topping up caps connected to each other by means of the gas discharging transverse duct 31, the handle can be put transversally to the alignment axis of the topping up caps 7.

Figure 2:
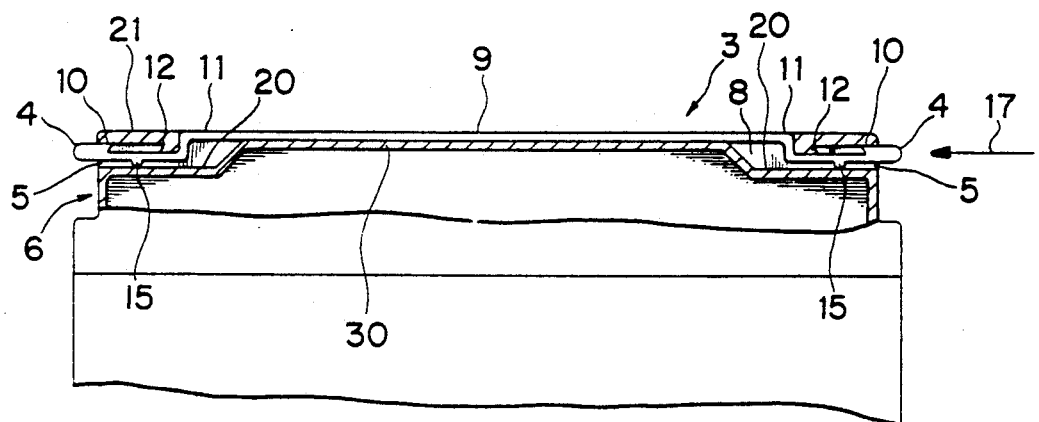
FIG. 2 shows a cross section of the lid equipped with a handle according to the invention being at rest in a horizontal position.
Figure 3:
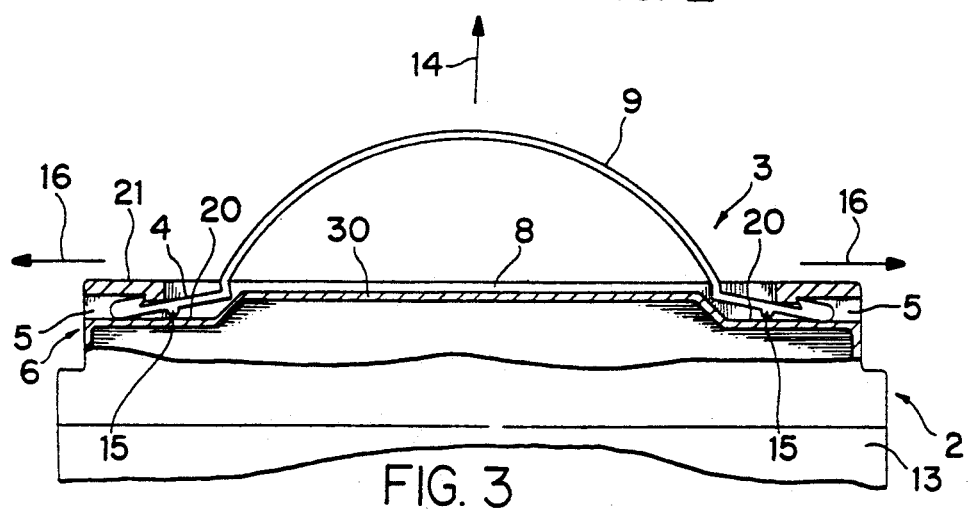
FIG. 3 shows a cross section of the lid equipped with a handle according to FIG. 2, said handle being lifted in the same position as when the accumulator is to be transported.

As can be seen in FIGS. 2 and 3, each end 4 of the handle presents a projecting tooth 10 and an angle-shaped ledge 11, while each opening 5 in which each end 4 of the handle 3 is inserted presents a projecting grip pawl 12. While the angle-shaped parts 11 are used for centering the body 9 of the handle within the housing 8 when the handle is at rest in a horizontal position as can be seen in FIG. 2, the projecting grip pawls 12 and the projecting teeth 10, made respectively in the opening 5 and in the ends 4 of the handle, are used for lifting the accumulator 13 which is coupled with the lid 2 when the body 9 of the handle is lifted by applying a vertical force 14.

In particular, it can be noted that in the lower part of each end 4, the handle 3 presents a protuberance 15 which is used for keeping the ends 4 of the handle raised over the lower plane 20 of the portion 6 on which the ends 4 lean, so as to keep the projecting grip pawls 12 and the projecting teeth 10 always aligned in the hooking direction. Moreover, the body 9 of the handle stays aligned with the upper surface 21 of the portion 6, since the housing 8 has its surface 30 raised over the lower plane 20 and acts as a support of the body 9 of the handle 3.

The insertion of the handle 3 in the lid 2 is possible by placing the handle as shown in FIG. 3 and forcing its ends 4 toward the direction indicated by the arrows 16, so as to make each end penetrate into the corresponding opening 5. In order to do this, it is enough that the force applied in the direction 16 is such that it overcomes the elastic resistance of each protuberance 15 against the plane 20. When both ends 4 are inside the openings 5, the handle 3 is released, it lowers down onto the plane 30 and assumes the horizontal position which is shown in FIG. 2.

To raise the handle, it is enough to apply a horizontal force in the direction 17 on one of the ends 4 of the handle, as can be seen in FIG. 2, so that the handle assumes the position shown in FIG. 3, both because of its elasticity and because its angle-shaped ledge 11 interacts with the edge of the opening 5 which is opposite to the direction of the force 17. At this point, the handle is easy to grasp and the accumulator can be easily lifted.

According to what has been said, it is understood that the lid equipped with a handle according to the invention fulfills all mentioned purposes.

First of all, the purpose of obtaining a lid equipped with a handle which is easy to realize, cheap and easy to assemble, is reached.

As far as the openings 5 made on the lid are concerned, it is understood how they can easily be realized by opportunely shaping the mould with which the lid is realized and, likewise, it is understood that the handle 3, with the same shape as that represented in the described figures, is easy to realize.

According to what has been described, it has also been seen how the application of the handle 3 is easy and can be manually made, without the need of facilities.

It has also been seen how, in case the topping up caps 7 of the lid are connected to each other by means of a gas discharging transverse duct, the latter is one and the same for all the topping up caps, since the housing of the handle is parallel to the alignment axis of the topping up caps.

It has also been seen that, given the shape of the handle ends, the handle 3 can be easily lifted and grasped; moreover, given the elasticity of the handle, it automatically goes back into the housing 8 when it is released. Lastly, since it has been seen that, when the handle 3 is at rest, it does not project over the upper surface 21 of the lid, the accumulators which are equipped with the lid according to the invention can be easily piled up.

During the manufacturing process, various changes and modifications can be made on the lid equipped with a handle according with the invention.

It has also been seen that, as for lids of small accumulators and for lids which do not have topping up caps which are connected to each other by means of the gas discharging transverse duct 31, the handle may also be placed transversally to the alignment axis of the topping up caps. Moreover, the projecting teeth 10 and the projecting grip pawls 12 can be made respectively in the ends 4 of the handle and in the openings 5 in which each end 4 is inserted, no matter what the shape is and how many they are.

Furthermore, the handle 3, which is preferably made of elastic plastic material, can also be made of other materials.

In addition, multiple handles can be utilized.

It is, however, understood that all the above-mentioned changes and variations will be included within the scope of the present invention.

I claim:

1. A lid equipped with a handle, for use with a container, comprising:
    an essentially flat surface which is part of an upper portion of the lid,
    said upper portion including two aligned openings on opposite sides of said upper portion,
    each of said openings having at least one projecting grip pawl located therein,
    a handle formed by an elastic body, having two ends which are received in said openings and having at least one projecting tooth on each end,
    a handle housing located in said upper portion and receiving said handle when it is not in use, and the projecting teeth of the handle engaging in the corresponding grip pawls of the lid when the handle is lifted.

2. A lid equipped with a handle according to claim 1, characterized in that a central body of the handle is connected to each end of the handle by means of an angle-shaped ledge which engages with the edge of the corresponding opening.

3. A lid equipped with a handle according to claim 1, characterized in that each end of the handle engages with a lower surface of the upper portion of the lid by means of the interposition of at least one protuberance which is part of the end of the handle.

4. A lid equipped with a handle according to claim 1, characterized in that the housing made in said upper portion presents a raised surface which is placed between a lower plane and the upper surface of the upper portion.

* * * * *